(12) United States Patent
Gunji

(10) Patent No.: US 7,408,528 B2
(45) Date of Patent: Aug. 5, 2008

(54) IMAGE PROCESSING APPARATUS AND METHOD USING EVACUATED REFERENCE IMAGES

(75) Inventor: Norihiro Gunji, Tochigi-ken (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 578 days.

(21) Appl. No.: 11/197,353

(22) Filed: Aug. 5, 2005

(65) Prior Publication Data

US 2006/0033679 A1 Feb. 16, 2006

(30) Foreign Application Priority Data

Aug. 5, 2004 (JP) ............................. 2004-228920

(51) Int. Cl.
*G09G 3/04* (2006.01)
(52) U.S. Cl. ........................................ 345/33; 382/128
(58) Field of Classification Search ................ 382/128, 382/131, 154, 173, 276, 282, 284, 293, 294, 382/300, 424; 345/33, 419, 424; 600/407
See application file for complete search history.

(56) References Cited

U.S. PATENT DOCUMENTS

| 6,384,846 B1 * | 5/2002 | Hiroi ........................... 715/794 |
| 2004/0051710 A1 * | 3/2004 | Hara ........................... 345/419 |
| 2006/0139318 A1 * | 6/2006 | Kariathungal et al. ....... 345/156 |
| 2006/0139319 A1 * | 6/2006 | Kariathungal et al. ....... 345/156 |

* cited by examiner

*Primary Examiner*—Samir A. Ahmed
*Assistant Examiner*—Mehdi Rashidian
(74) *Attorney, Agent, or Firm*—Oblon, Spivak, McClelland, Maier & Neustadt, P.C.

(57) ABSTRACT

An image processing apparatus and method which displays MPR images at a plurality of image displaying areas including full image displaying areas and at least one evacuating image displaying area. When the number of MPR images exceeds the number of image displaying areas, the MPR images are sorted into images for construction and images for evacuation based on a priority order of display conditions. The MPR images may be reduced in size to arrange more than one evacuated image in an evacuating image displaying area.

14 Claims, 14 Drawing Sheets

IMAGE PROCESSING APPARATUS AND METHOD USING EVACUATED REFERENCE IMAGES

CROSS-REFERENCE TO RELATED APPLICATIONS

This application claims priority from, and the benefit of, Japanese Patent Application No. 2004-228920, filed on Aug. 5, 2004, the contents of which are expressly incorporated herein by reference in their entirety.

BACKGROUND OF THE INVENTION

A. Field of the Invention

The present invention relates to an image processing apparatus and image processing method. The present invention further relates to an image processing apparatus and image processing method using evacuated images for image diagnosis.

B. Background of the Invention

An image processing apparatus used in an image diagnosis apparatus, such as an X-ray Computed Tomography (CT) apparatus, a Magnetic Resonance Imaging (MRI) apparatus, and an ultrasound diagnosis apparatus, processes acquired image data in order to display a plurality of images, such as Multi Planar Reconstruction (MPR) images and three-dimensional images.

The MPR image displays an axial image, a coronal image and a sagittal image as three orthogonal cross sections. Further, the MPR image includes various other images, such as an oblique image, double oblique images, and a curved MPR image. The three-dimensional image also includes images generated by many methods, such as a volume rendering method, Maximum Intensity Projection (MIP) method and an averaging method. Consequently, it becomes difficult to simultaneously display all of such various kinds of images in a limited space of a screen for an image diagnosis apparatus.

It has been proposed to evacuate overflowed images from among the acquired image data. The evacuated images are usually stored at an outside area, such as screen corners, away from a normal displaying area of the screen.

It is difficult to directly use the stored evacuation images as reference images for a diagnosis. To use an evacuated image as a reference image for a diagnosis, the evacuated image is moved into a normal displaying area of the screen. To search for a desired image, an operator must then search evacuated images stored in corners of the screen and/or hidden under a displayed image.

SUMMARY OF THE INVENTION

The present invention provides an image processing apparatus and image processing method that permits the usage of evacuation images for diagnosis.

According to one embodiment of the present invention, an image processing apparatus, includes:

an image construction unit configured to output a plurality of different MPR images based on external image data acquired through image diagnosis equipment; a condition setting unit configured to set a priority order of display conditions for the MPR images; a displaying unit configured to display the MPR images at a plurality of image displaying areas including full image displaying areas and at least one evacuating image displaying area; a sorting unit configured to sort the plurality of MPR images into images for construction and images for evacuation based on the priority order of the display conditions, when a number of the MPR images exceeds a number of the image displaying areas; and a control unit configured to control display of the MPR images in the full image displaying areas and the evacuating image displaying area, and to reduce the images for evacuation into a predetermined size.

According to another embodiment of the present invention, an image processing method includes: outputting a plurality of different MPR images based on external image data acquired through image diagnosis equipment; setting a priority order of display conditions for the MPR images; displaying the MPR images at a plurality of image displaying areas including full image displaying areas and at least one evacuating image displaying area; sorting the plurality of MPR images into images for construction and images for evacuation based on the priority order of the display conditions, when a number of the MPR images exceeds a number of the image displaying areas; and controlling display of the MPR images in the full image displaying areas and the evacuating image displaying area, and reducing the images for evacuation into a predetermined size.

It is to be understood that both the foregoing general description of the invention and the following detailed description are exemplary, but are not restrictive of the present invention.

BRIEF DESCRIPTION OF THE DRAWINGS

The present invention is best understood from the following detailed description, when read in conjunction with the accompanying drawings. The accompanying drawings, which are incorporated in and constitute part of this specification, illustrate various non-limiting embodiments and/or features of the present invention, and together with the description, serve to explain the present invention. Where possible, the same reference number will be used throughout the drawings to describe the same or like parts. In the drawings.

DESCRIPTION OF THE EMBODIMENTS

In the present invention, at least one evacuating area may be provided in a normal displaying area in order to display evacuated images. Consequently, the evacuated images may be used as reference images for diagnosis and can also be easily retrieved.

With reference to the following FIGS. 1-14, non-limiting embodiments consistent with the present invention will be explained. An exemplary embodiment, according to the image processing apparatus consistent with the present invention, will be explained as to MPR images based on image data acquired and reconstructed in three dimensions by an X-ray CT apparatus.

The present invention is also applicable to image processing for other image diagnosis apparatuses, such as an MRI apparatus or an ultrasound diagnosis apparatus. Thus, the present invention is applicable to display MPR image data acquired through an MRI apparatus or an ultrasound diagnosis apparatus as cross section images, such as axial images, coronal images, and sagittal images; and applicable to display three-dimensional images by a volume rendering method, MIP method or averaging method.

Figure 1:
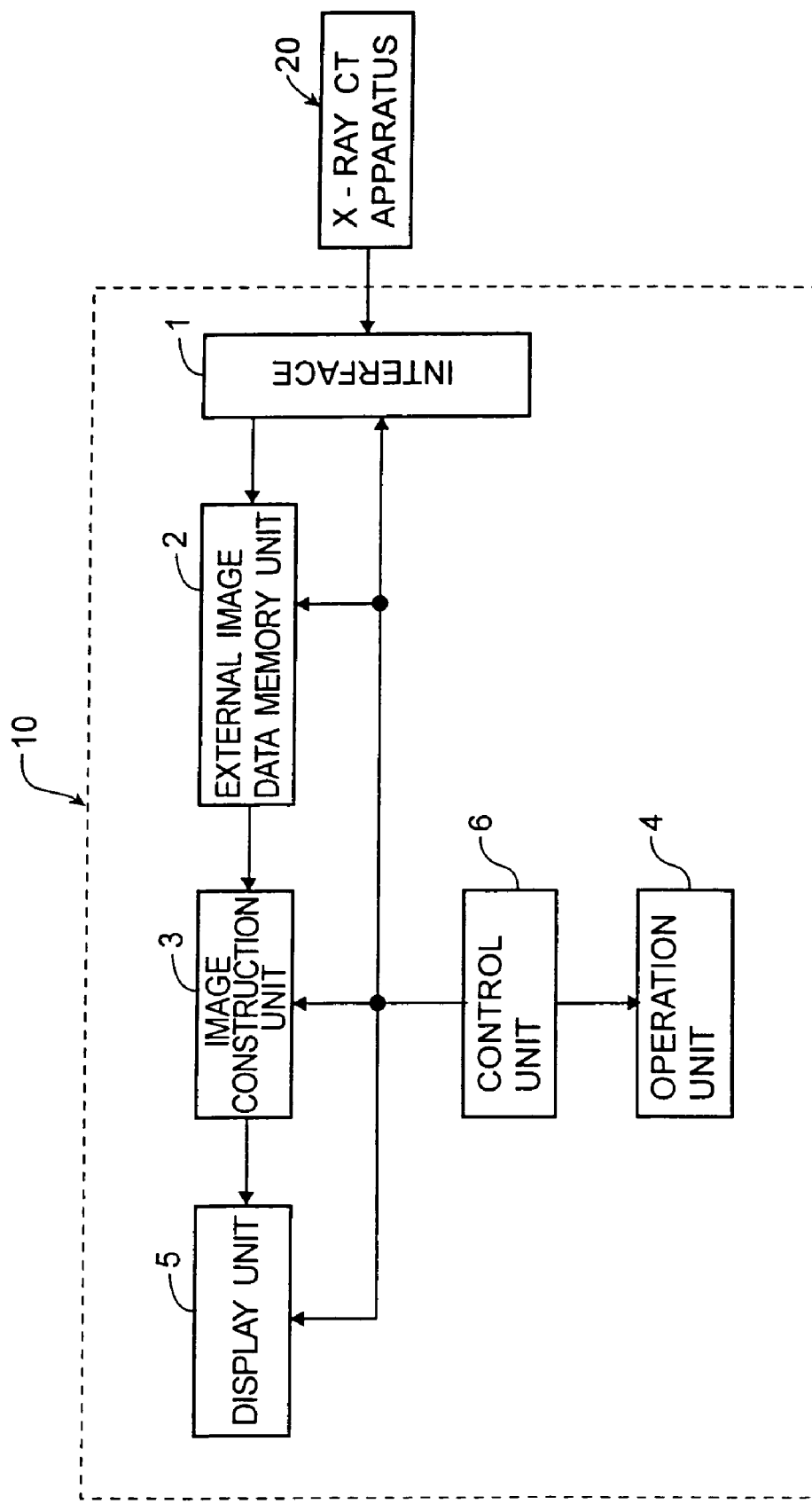
FIG. 1 is a block diagram illustrating a construction of an image processing apparatus consistent with the present invention.

FIG. 1 shows an exemplary block diagram of an image processing apparatus according to a non-limiting embodiment of the present invention. Image processing apparatus 10 collects a plurality of tomography images through an X-ray CT apparatus 20. Through an interface 1, image processing apparatus 10 acquires external image data that is reconstructed as a three dimensional image. The acquired image data is stored in an external image data memory unit 2. An image construction unit 3 constructs various images by processing image data stored in external image data memory unit 2.

Image processing apparatus 10 further includes a display unit 5, an operation unit 4 and a control unit 6. Display unit 5 displays images constructed by image construction unit 3, including evacuated images and MPR images. Operation unit 4 operates image construction, selection of many conditions for image displaying and input of various commands. Control unit 6 controls total unit operation of the image processing apparatus.

External image data memory unit 2 includes memory devices, such as magnetic disks, for storing three dimensional image data reconstructed by X-ray CT apparatus 20.

Image construction unit 3, which includes a memory circuit and a processor circuit, constructs desired image data, stored in the external image data memory unit 2, into various cross sectional images, such as axial images, sagittal images, coronal images, oblique images, double oblique images, panorama images or crosscut images. Image construction unit 3 further performs various construction functions, such as construction of image displaying areas for drawing various images, construction of an evacuated image as a reduced image, construction of an evacuation area for displaying an evacuated image, and construction of an MPR image arranging an image displaying area and an evacuated image.

Operation unit 4 includes an interactive interface to input devices, such as a keyboard, a track ball or a mouse, various switches and a display panel that utilizes a portion of display unit 5. Operation unit 4 inputs object data to be displayed on display unit 5, image constructing conditions for displaying an image in a displaying area of an MPR image and various commands.

Display unit 5 includes a monitor of a liquid crystal or a cathode ray tube (CRT) in order to display MPR images that are constructed by image construction unit 3.

Control unit 6 includes a CPU and a memory circuit for controlling operation of the system. After once storing operation command signals supplied from operation unit 4 to the memory circuit, control unit 6 controls interface 1, external image data memory unit 2, image construction unit 3 and display unit 5 based on the operation command signals.

Figure 2:
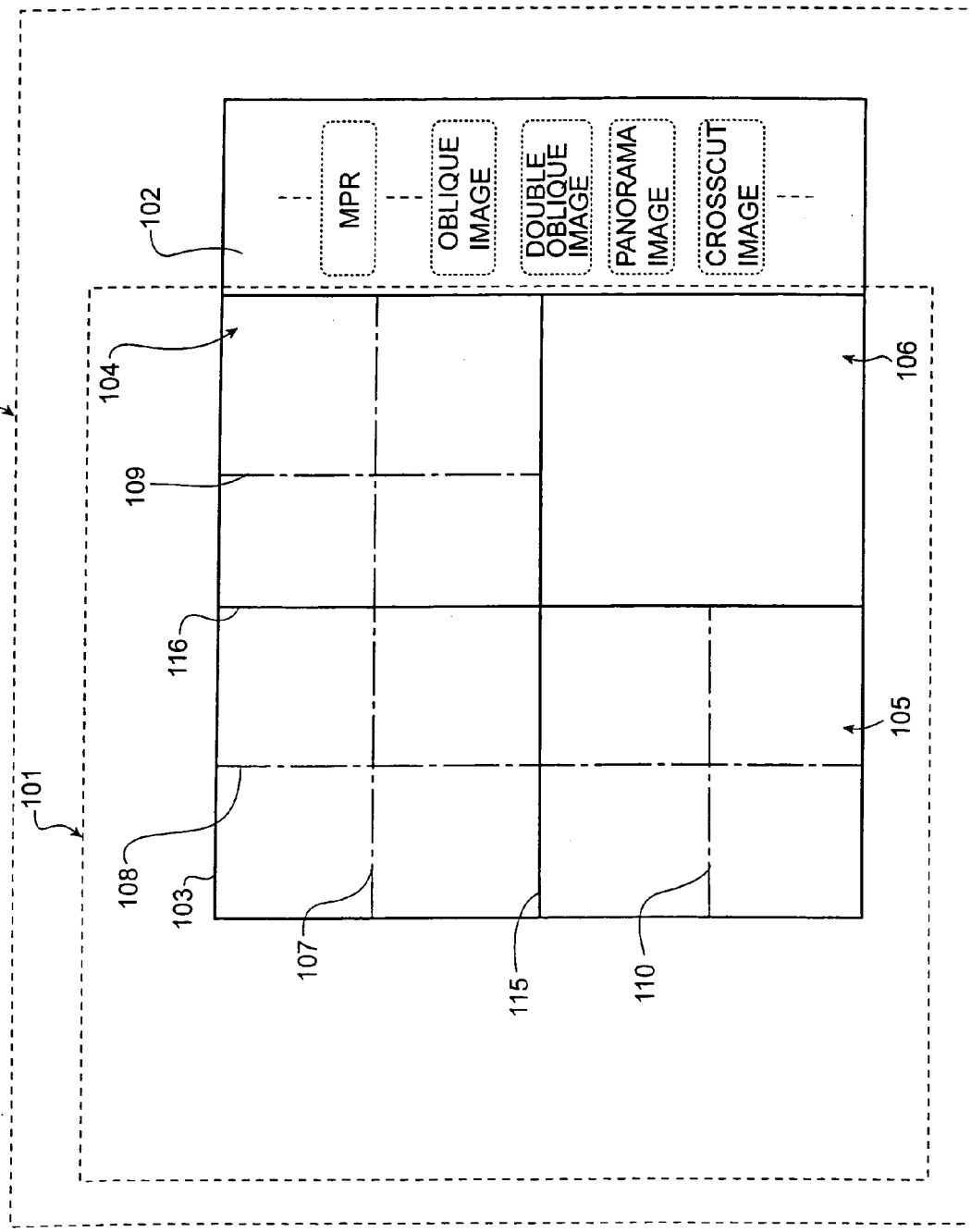
FIG. 2 illustrates an embodiment of screen construction of a display unit showed in FIG. 1.

FIG. 2 illustrates a screen composition of an MPR image that is displayed on a monitor screen of display unit 5 shown in FIG. 1. Displayed screen 100 is comprised of an MPR image display area 101 for displaying MPR images and a MPR control panel 102, which displays various switches for setting or changing the kinds of images to be displayed in MPR image displaying area 101 and for image construction conditions.

MPR image displaying area 101 is approximately formed as a square. A lateral dividing line 115 being parallel to a lateral side of the square and a longitudinal dividing line 116 being parallel to a longitudinal side of the square are orthogonally crossed at a center of the square. Thus, MPR image display area 101 includes four image displaying areas separated by the lateral dividing line 115 and the longitudinal dividing line 116. In this embodiment, four image displaying areas (defined by solid lines) are formed as A image displaying area 103, B image displaying area 104, C image displaying area 105 and D image displaying area 106.

In this embodiment, an MPR image of an initial state is displayed in A image displaying area 103. In B image displaying area 104 and C image displaying area 105, coronal images, sagittal images and axial images that are movable to another image displaying area are drawn.

To set an image construction condition for the coronal image, sagittal image and axial image in each of the image displaying areas, AB cross section cursor 107 is set along a lateral direction to A image displaying area 103 and B image displaying area 104. AC cross section cursor 108 is set along a longitudinal direction of A image displaying area 103 and C image displaying area 105. Further, B cross section cursor 109 is set along a longitudinal direction of B image displaying area 104; and C cross section cursor 110 is set along a lateral direction of C image displaying area 105. Each of cursors 107-110 can be hidden from view.

In FIG. 2, AB cross section cursor 107 and AC cross section cursor 108 are shown so as to orthogonally cross at a center of A image displaying area. It is possible to move the cursors 107 and 108 along a direction parallel to longitudinal dividing line 116 and dividing line 115, respectively, in A image displaying area 103.

Similarly, AB cross section cursor 107 and B cross section cursor 109 are orthogonally crossed at a center of B image displaying area 104. It is also possible to move cursors 107 and 109 along a direction parallel to longitudinal dividing line 116 and lateral dividing line 115, respectively, in B image displaying area 104.

It is also possible to move C cross section cursor 110 and AC cross section cursor 108, which are orthogonally crossed at a center of C image displaying area 105, along a direction parallel to longitudinal dividing line 116 and lateral dividing line 115, respectively, in C image displaying area 105.

To move the cross section cursors in each of the divided display areas, a pointer on the screen 100 is placed onto a desired cross section cursor by operating a mouse in the operation unit 4 shown in FIG. 1. By dragging, the placed cross section cursor is moved to a desired position and the pointer is released.

Further, it is possible to move and set the displayed movable cross section cursors, such as the oblique cross section cursor, the double oblique cross section cursor, the panorama cross section cursor, and the crosscut cross section cursor, to a desired position on the MPR image display area 101 through operation of the MPR control panel 102 displayed on the screen 100. The above cursors are used to construct new images of an oblique image, double oblique image, panorama image and crosscut image, respectively.

By adding the new images on MPR image display area 101 through the above-explained operation, it may occur that all of the images cannot be displayed in the four areas of A image displaying area 103 to D image displaying area 106. In such a case, the four areas of A image displaying area 103 to D image displaying area 106 are divided into two groups of area based on conditions set in a display condition setting window that will be explain later. Thus, the four areas are divided into a higher priority full image displaying area group and a lower priority evacuating area group for displaying evacuated images.

A image displaying area 103 may be the evacuating area, and B image displaying area 104 to D image displaying area 106 may be the priority image displaying areas. To display evacuated images in the evacuating area, those images may be reduced to a predetermined size.

Reduction of evacuated image size can be performed by operating an evacuated image size setting switch on MPR control panel 102. For example, if an evacuated image size is reduced to one-half (½), it becomes possible to display two to four evacuated images. If an evacuated image size is reduced to one-third (⅓), it becomes possible to display five to nine of the evacuated images in an evacuating area.

In an exemplary case, an evacuation image size is reduced to one-half (½). Of course, it is possible to reduce the evacuation image size to one-third (⅓).

In MPR control panel 102, display condition setting switches are provided. Display condition setting switches include an image data list calling switch for calling various image data lists stored in image data memory unit 2 shown in FIG. 1; a cross section cursor displaying switch for constructing an initial state MPR image, and as well as oblique images, double oblique images, panorama images and crosscut images that are constructed after construction of the initial state and after setting image construction conditions; an image selection switch for setting and selecting an image construction condition of various MPR images; and a finishing switch for closing the displayed image on the screen 100.

Figure 3:
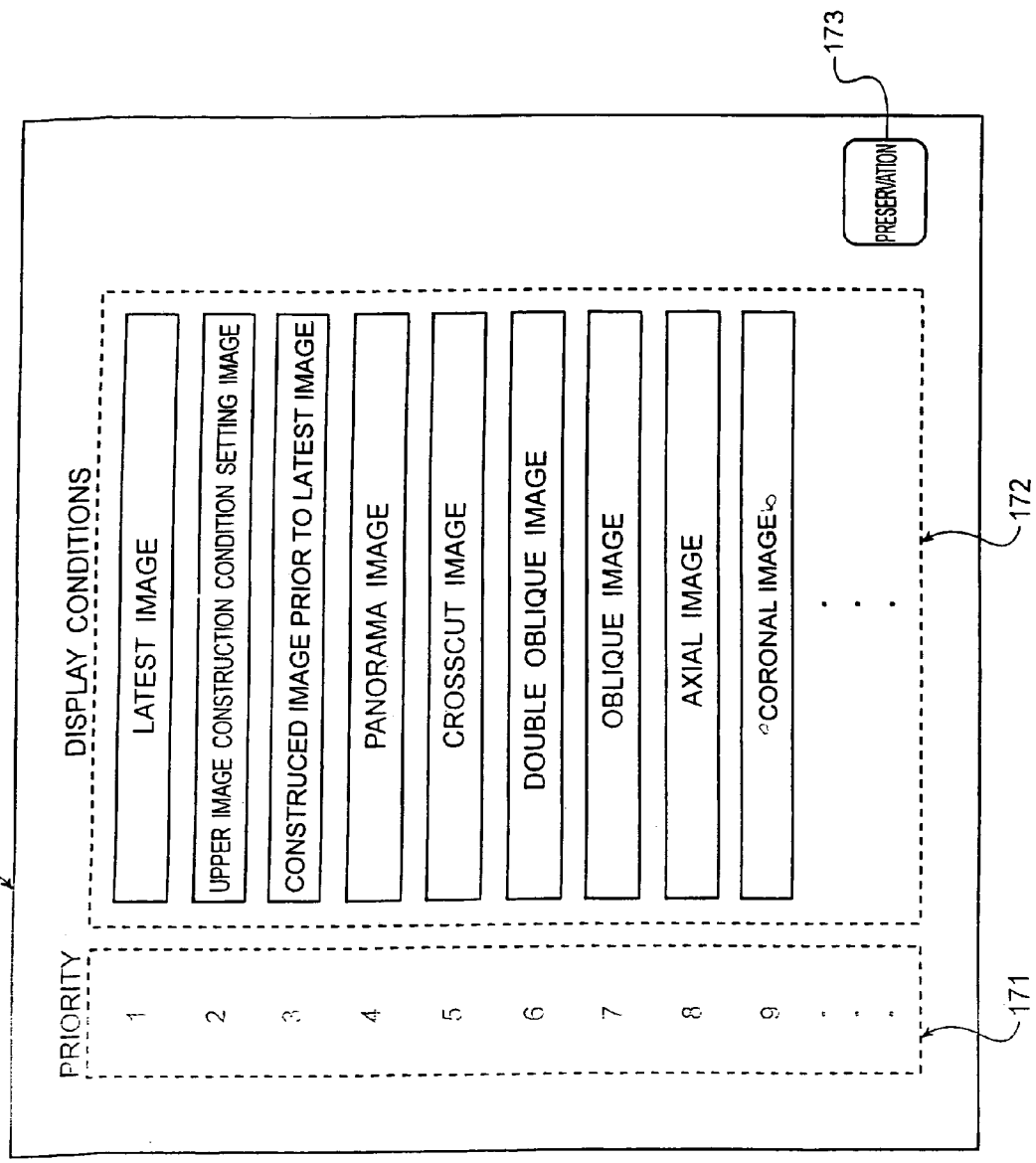
FIG. 3 illustrates an embodiment of a display condition setting window consistent with the present invention.

FIG. 3 illustrates a display condition setting window for operating the display condition setting switches. Display condition setting window 170 includes a priority display area 171 that displays priority order by numbers, a display image setting area 172 for setting display conditions and a preservation button 173 for storing the display conditions appearing in the image setting area 172.

Display condition setting window 170 is displayed on MPR image display area 101 by pushing a display condition setting switch provided on MPR control panel 102 shown in FIG. 2.

In the priority display area 171, priority numbers are displayed with ordering from a highest priority order, priority 1. Next is priority 2 and follows then priority 3 and so on.

In the image setting area 172, a plurality of rectangular frames for setting a display condition for each of the respective priority numbers of the priority display area 171 are provided. By moving a mouse pointer of operation unit 4 onto the rectangular frame, it becomes possible to select a priority number and a desired display condition from among the plurality of display conditions. By pressing the preservation button 173, the respective conditions for each of the priority numbers are stored in the display condition setting area of the memory circuit in control unit 6.

Priority ordering is performed when the total number of images intended for display in MPR image display area 101 is five (5) or greater. When the evacuating area is constructed, the three (3) images of the top three priority order, which are selected from among all images, including the evacuated images displayed in the evacuating area, are displayed in the three image displaying areas B-D. The remaining images are displayed as evacuated images in the evacuating area A.

When it is impossible to sort the highest three images of priority order by the display priority 1, the priority ordering is performed by selecting the images satisfying the display conditions of priority number 1, then priority number 2, and so on. At a time when the three highest ranking images of the priority order are sorted, the priority ordering is finished.

If more than two (2) images of the same rank are selected under a certain priority of display conditions, the priority ordering for these images is void. By proceeding to the next lower priority number, priority ordering is again performed, under the new display conditions, against these images and the images that were not yet subjected to priority ordering.

If the images or evacuated images selected under a display condition at a particular priority have already been ordered under a display condition of a higher priority than the particular priority, the display condition of the particular priority becomes invalid and, again, priority ordering is performed under a display condition of a lower priority than the particular priority.

Setting a display condition in the image setting area 172 may be performed as follows. For instance, in order to select the latest constructed image on MPR image display area 101 as a display condition of the priority 1, [priority 1] in the priority display area 171 is selected; and, then, [the latest image] is selected from among display conditions in the image setting area 172 and is set.

As a display condition at priority 2, for example, in order to select an image for setting a cross section cursor that constructs an image of a higher priority order, [priority 2] in the priority display area 171 is selected; and, then [higher image construction condition setting image] in the image setting area 172 is selected and is set.

In order to select an image that is constructed one image before the latest image as a display condition priority 3, [priority 3] in the priority display area 171 is selected; and, then, [an image constructed prior to the latest image] in the image setting area 172 is selected and is set.

Similarly, for example, a display condition of [panorama image] is selected at priority 4, a display condition of [crosscut image] is selected at priority 5, a display condition of [double oblique image] is selected at priority 6, a display condition of [oblique image] is selected at priority 7, a display condition of [axial image] is selected at priority 8, and a display condition of [coronal image] is selected at priority 9.

By using such a function of the display condition setting window 170 for priority ordering of the images based on a display condition, even when five (5) or more images are constructed in MPR image display area 101 or when an image is constructed while evacuated images are already present, it becomes possible to perform priority ordering for both the images being constructed under the display conditions of the display condition setting window 170 and the evacuated images.

Figure 4:
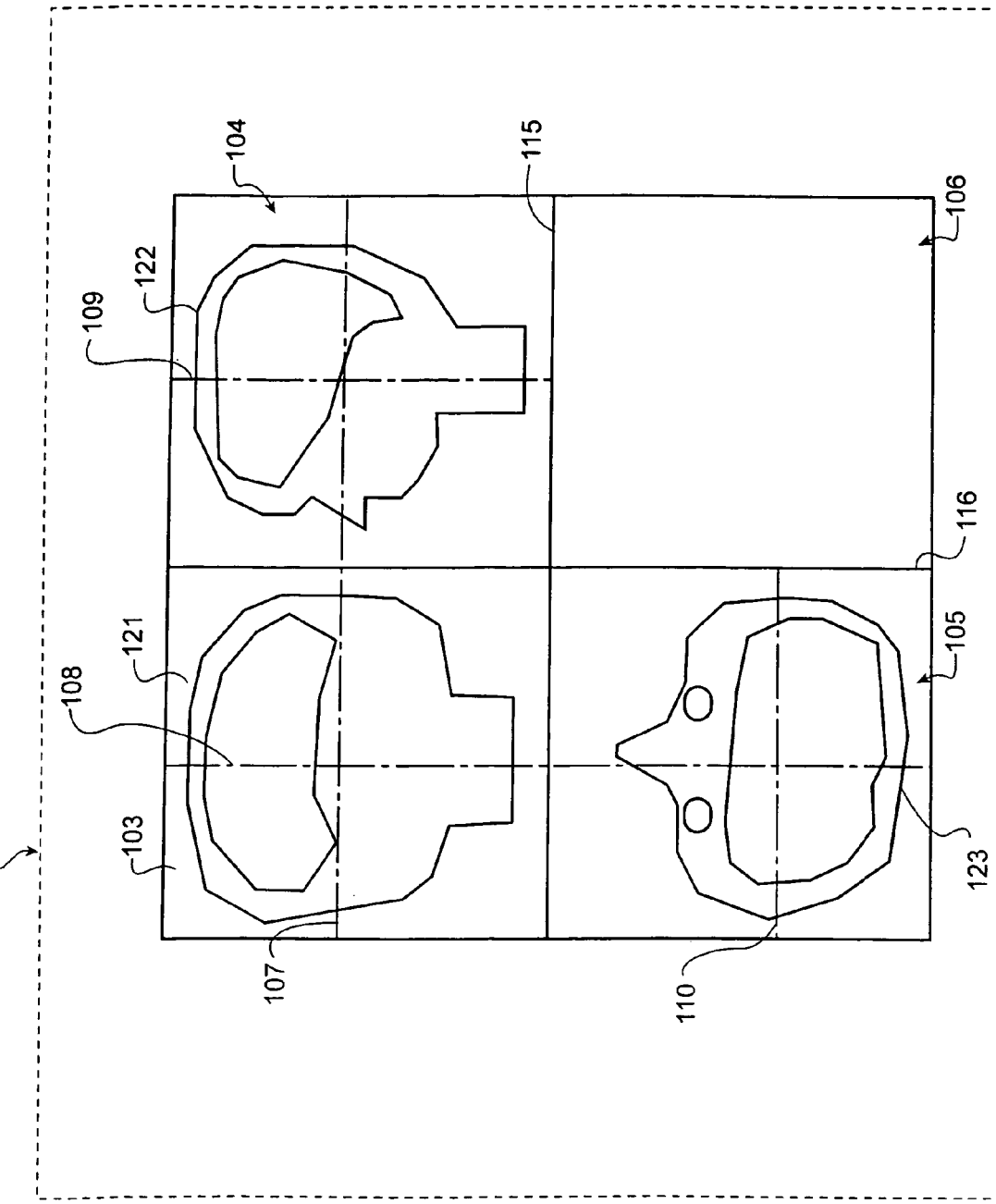
FIG. 4 shows an MPR image of an initial stage consistent with an embodiment according to the present invention.

FIG. 4 shows an MPR image of an initial state. MPR image 120 of the initial state is displayed by selecting image data of a desired object among the image data list through an operating control panel of a monitor, such as the control panel in display unit 5 shown in FIG. 1, and by pushing an image select switch among the display condition setting switches in MPR control panel 102 in order to select an MPR image.

Initial state MPR image 120 is comprised of a coronal image 121 that is a cross section image being drawn in A image displaying area 103 so as to be parallel to a face of an object, a sagittal image 122 displayed in B image displaying area 104 as a cross section image so as to vertically cut a face of an object, and an axial image 123 displayed in C image displaying area 105 so as to display a head portion cross section being cut along a body axis.

Coronal image 121 in A image displaying area 103 shows a cross section formed by B cross section cursor 109, which is displayed by a straight line on the sagittal image 122 in B image displaying area 104, or, a cross section formed by C cross section cursor 110 displayed by a straight line on the axial image 123 in C image displaying area 105.

Sagittal image 122 in B image displaying area 104 shows a cross section at a position of AC cross section cursor 108 displayed by a straight line on the coronal image 121 in A image displaying area 103 or the axial image 123 in C image displaying area 105.

Axial image 123 in C image displaying area 105 shows a cross section at a position of AB cross section cursor 107 displayed by a straight line on the coronal image 121 in A image displaying area 103 or the sagittal image 122 in B image displaying area 104.

FIGS. 5-8 illustrated various images that may be additionally constructed on the initial state MPR image 120.

Figure 5:
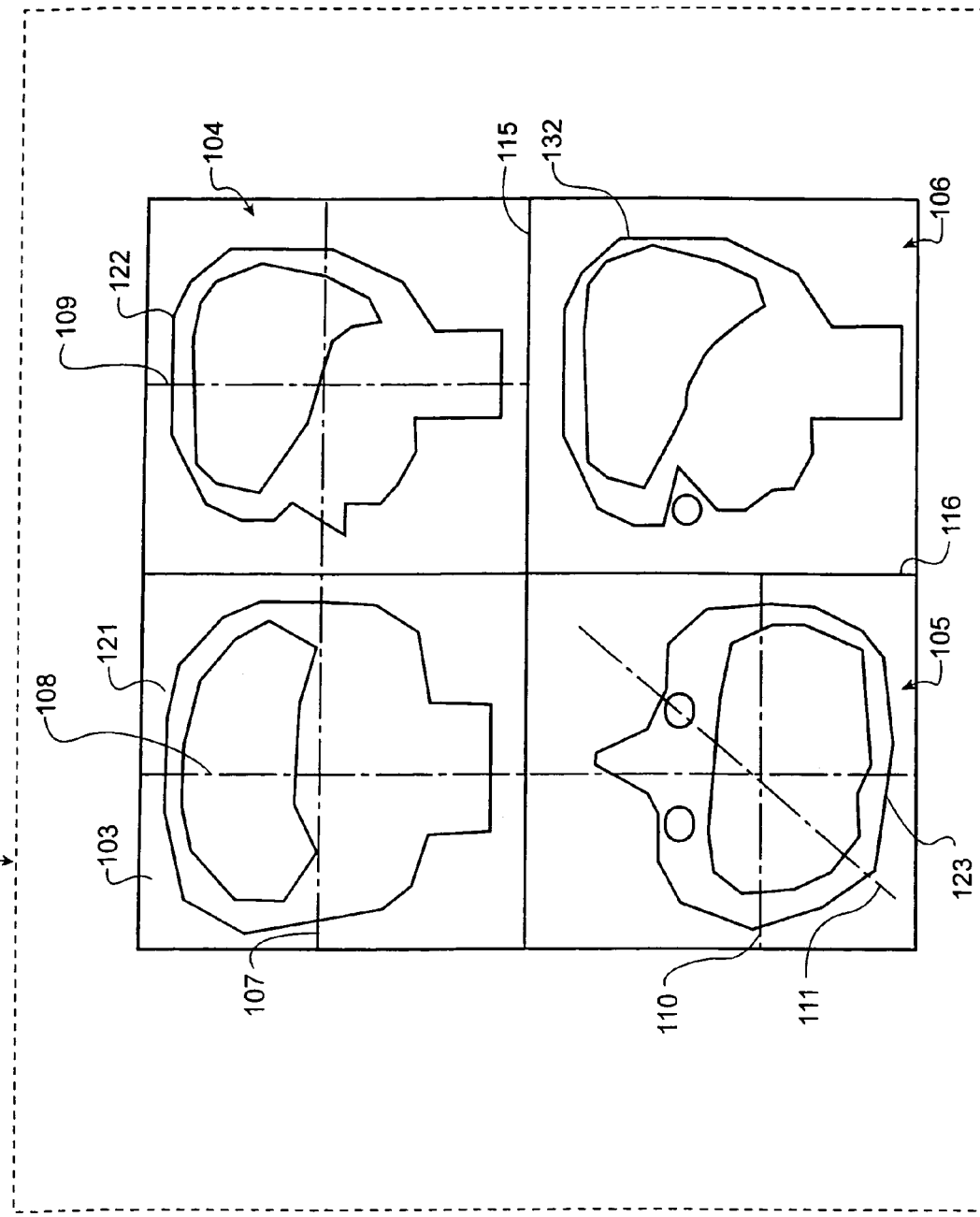
FIG. 5 depicts an MPR image that is added to an oblique image display consistent with an embodiment according to the present invention.

In FIG. 5, oblique images are constructed by adding to the initial state MPR image 120 shown in FIG. 4. Oblique image additionally displayed MPR image 130 includes an oblique image 132 that is formed by operating the MPR control panel 102 of FIG. 2 when the initial state MPR image 120 is displayed. At that time, an oblique cross section cursor 111 is additionally displayed in order to set the image construction condition of the oblique image 132 on the axial image 123.

Thus, the oblique image 132 displayed in D image displaying area 106 shows a cross section at a position of the oblique C cross section cursor 111 displayed on the axial image 123 in C image displaying area 105.

The oblique cross section cursor is displayed by pushing the oblique image switch in MPR control panel 102 and setting the oblique cross section cursor at 111 a desired angle on a particular image. In this example, the oblique cross section cursor 111 is set on the axial image 123 of C image displaying area 105.

Figure 6:
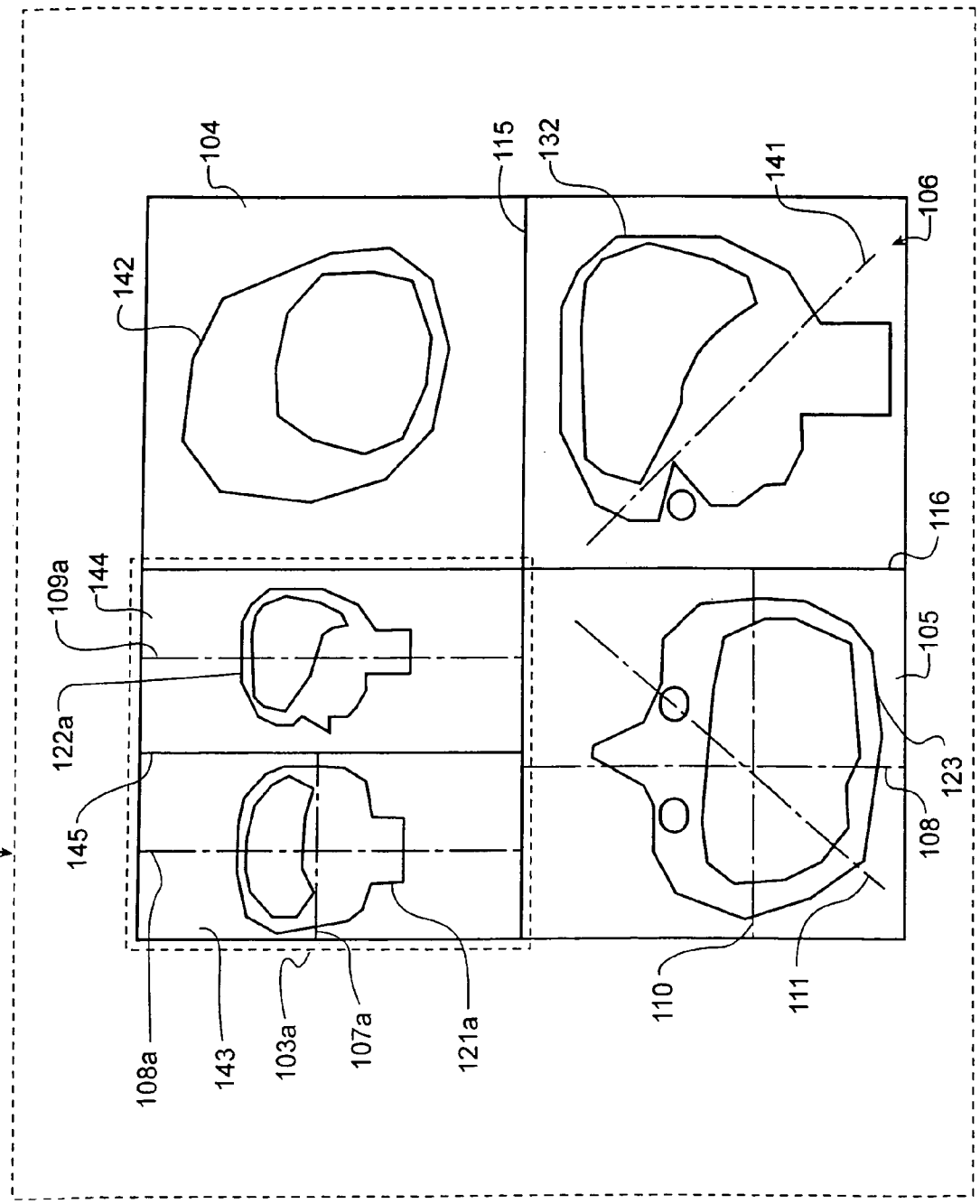
FIG. 6 shows an MPR image that displays a first evacuated image consistent with an embodiment according to the present invention

FIG. 6 illustrates a double oblique image 142 and evacuated images that are displayed after construction of the oblique image displayed by MPR image 130 in FIG. 5.

In a first evacuated image display MPR image 140, a double oblique image 142 and a double oblique cross section cursor 141 are displayed by operating MPR control panel 102, shown in FIG. 2, when the oblique image display MPR image 130 is displayed. Further, A evacuating area 103a is displayed in the first evacuated image display MPR image 140.

Thus, the first evacuated image display MPR image 140 includes a double oblique image 142 being constructed and displayed in B image displaying area 104, an axial image 123 displayed in C image displaying area 105, a double oblique cross section cursor 141 additionally displayed on the oblique image 132 in D image displaying area 106, and two evacuated images of a coronal image 121a and sagittal image 122a evacuated in areas 143 and 144, respectively, of A evacuating area 103a. Note that the axial image 123, coronal image 121a and sagittal image 122a correspond to images of the oblique image displayed MPR image 130.

Double oblique image 142 displayed in B image displaying area 104 shows a cross section at a position of a double oblique cross section cursor 141 displayed on oblique image 132 in D image displaying area 106.

In C image displaying area 105, C cross section cursor 108, C cross section cursor 110, and C oblique cross section cursor 111 are displayed on the axial image 123.

In D image displaying area 106, a double oblique cross section cursor 141 is additionally displayed on the oblique image 132 displayed in D image displaying area 106.

It is possible to display or to hide a double oblique cross section cursor 141 on oblique image 132 by pushing a double oblique image switch on MPR control panel 102. It is further possible to adjust an angle or transverse position of the displayed double oblique cross section cursor 141.

An evacuation area 103a is provided at A image displaying area 103 of oblique image display MPR image 140. The A evacuation area 103a is divided into two areas of A1 evacuation area 143 and A2 evacuation area 144 by a longitudinal evacuation area dividing line 145 displayed in a center of A evacuation area 103a.

A1 evacuation area a 143 displays the coronal image 121, A cross section cursor 107, and A cross section cursor 108 of FIG. 5 as an evacuated coronal image 121a, an evacuated A cross section cursor 107a, and an evacuated A cross section cursor 108a.

A2 evacuation area a 144 displays the sagittal image 122, B cross section cursor 107, and B cross section cursor 109 as an evacuated sagittal image 122a, an evacuated A cross section cursor 107a, and an evacuated A cross section cursor 109a.

Sorting of the images displayed in each of the image displaying areas in the first evacuation image display MPR image 140 is performed as follows. Due to a construction of double oblique image 142, the total number of images becomes five (5). Consequently, it becomes impossible to display all of the images in the image displaying areas, since the total number of the image displaying areas is four (4). Accordingly, an evacuation area is constructed in order to display some of the images as evacuation images.

Priority ordering is performed against the five (5) images. Then, images that are rated as priority orders 1 to 3 are displayed in each optional image displaying area among A image displaying area 103 to D image displaying area 106. The remaining two (2) images that are rated a priority order of four (4) or lower are displayed as evacuation images in the newly constructed evacuating area by reducing their size by one-half (½). In this exemplary embodiment, the evacuating area is provided in A image displaying area 103.

Priority ordering is performed against five images, which include the four images of coronal image 121, sagittal image 122, axial image 123 and oblique image 132 (FIG. 5) set by the display condition setting window 170 (FIG. 3) and a newly constructed double oblique image 142.

In priority ordering, double oblique image 142 of the latest image is rated as priority order 1, and oblique image 132 is rated as priority 2 since this image is needed to set the image construction condition for double oblique image 142. Axial image 123 is rated as priority order 3 since this image 123 is needed to set image construction condition for oblique image 132. Accordingly, these images of priority orders 1 to 3 are displayed in any of B image displaying area 104 to D image displaying area 106. Coronal image 121 and sagittal image 122, rated as priority order 4 or lower, are reduced to one-half (½) size and displayed in A evacuation area 103a.

In the first evacuated image display MPR image 140 (FIG. 6) of this embodiment, axial image 123 and oblique image 132 are displayed in C image displaying area 105 and D image displaying area 106 as similarly to oblique image added display MPR image 130 (FIG. 5). Double oblique image 142 is displayed in B image displaying area 104. It is possible to display each of the images in image displaying areas other than the above-specified image displaying areas.

Similarly, although A evacuation area 103a is placed at A image displaying area 103 in this embodiment, for example, it is also possible to set B image displaying area 104 in the oblique image display MPR image 130 as the evacuation area.

In this embodiment, two evacuated images are displayed in A evacuation area 103a by equally dividing the A evacuation area 103a into two parts through a longitudinal evacuation area dividing line 145. In the A1 evacuation area 143, evacuated coronal image 121a is displayed. And in A2 evacuation area 144, evacuated sagittal image 122a is displayed. The evacuation areas for each of the evacuated images are not restricted to the above description.

In each of A1 evacuation area 143 and A2 evacuation area 144, it is possible to display an evacuated image and evacuated cross section cursor in the same layout applied to the image and cross section cursor of the previous corresponding image displaying area. Alternatively, the respective cross sections of oblique image 132 and axial image 123 can be altered by moving the evacuated cross section cursors. Further, it is possible to exchange evacuated coronal image 121a and evacuated sagittal image 122a with each other.

Figure 7:
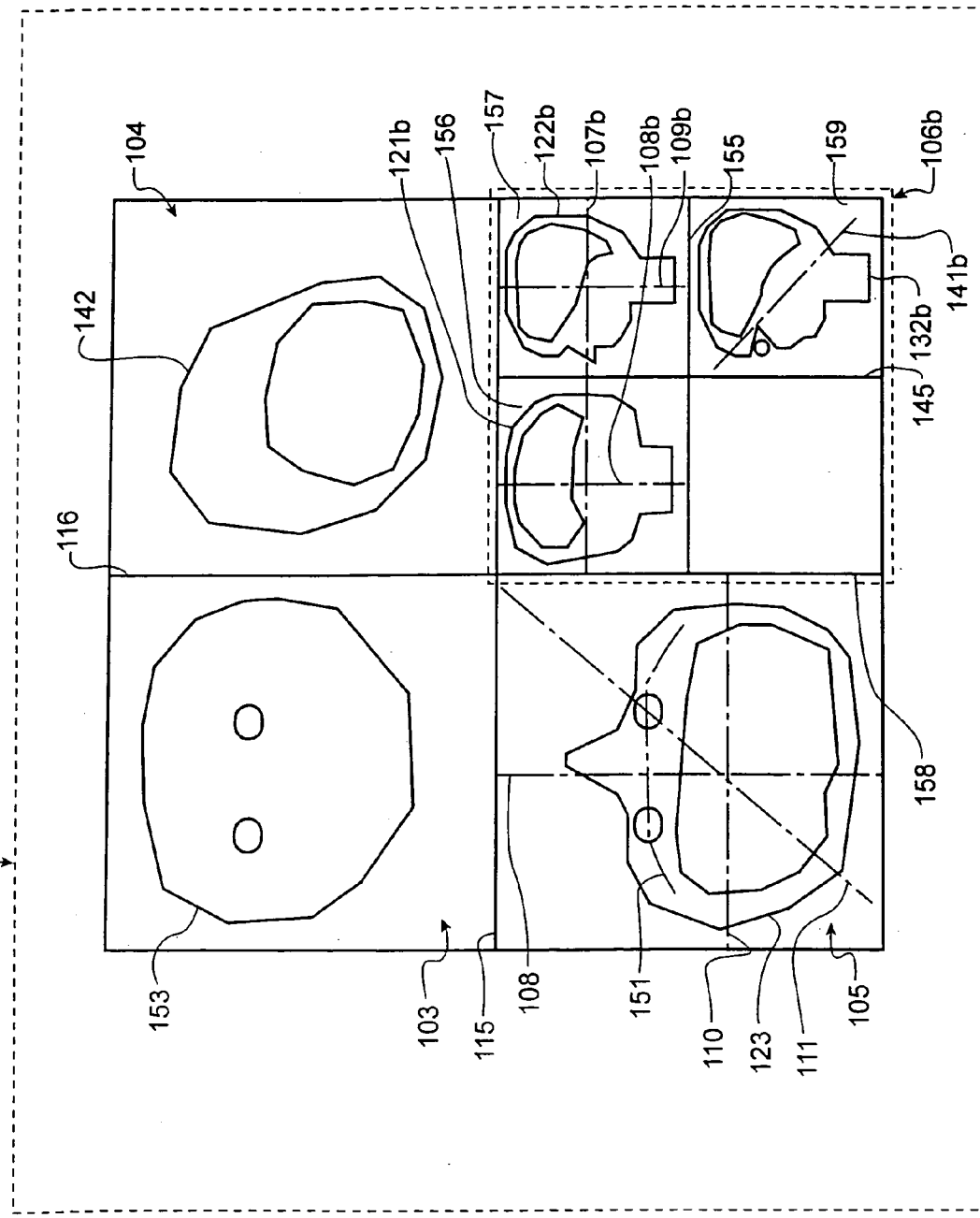
FIG. 7 depicts an MPR image that displays a second evacuated image consistent with an embodiment according to the present invention.

FIG. 7 explains a second evacuated image display MPR image 150 in which a panorama image is constructed and displayed on the double oblique image 142 of the first evacuated image display MPR image 140 in FIG. 6.

In the second evacuated image display MPR image 150, a panorama image 153 and a panorama cross section cursor 151 are additionally displayed on the first evacuated image displaying area MPR image 140, together with evacuation area 106b, by operating MPR control panel 102 in FIG. 2 when displaying the first evacuated image display MPR image 140.

The second evacuated image display MPR image 150 displays a newly constructed panorama image 153 in A image displaying area 103, a double oblique image 142 in B image displaying area 104, and a panorama cross section cursor 151 that is additionally added to the axial image 123 in C image displaying area 105. Further, the second evacuated image display MPR image 150 evacuates three evacuated images into D evacuating area 106b.

Panorama image 153 in the A image displaying area 103 shows a cross section at a position of a panorama cross section cursor 151, shown by a curved line on the axial image 123 in C image displaying area 105.

In B image displaying area 104, a double oblique image 142 is displayed as the same display in B image displaying area 104 of the first evacuated image display MPR image 140.

Panorama cross section cursor 151 on the axial image 123 in C image displaying area 105 is displayed by pushing a panorama image switch in MPR control panel 102 and by arranging panorama cross section cursor 151 on C image displaying area 105. By freely adjusting the transverse position, curvature and the length of the curved line in C image displaying area 105, the panorama cross section cursor 151 is set and displayed at a desired position on axial image 123.

Evacuation area 106b in FIG. 7 is located at the same area of D image displaying area 106 in the first evacuated image display MPR image 140. D evacuation area 106b is divided into four (4) portions of D1 evacuating area 156, D2 evacuating area 157, D3 evacuating area 158 and D4 evacuating area 159 by a lateral evacuation area dividing line 155 (that is provided in parallel to the lateral dividing line 115) at a center of D image displaying area 106 and a longitudinal evacuating area dividing line 145 (that is provided in parallel to longitudinal dividing line 116) at the center of D image displaying area 106.

In D1 evacuation area 156, an evacuated coronal image 121b is the same size as the evacuated coronal image 121a in FIG. 6. An evacuated D cross section cursor 107b and an evacuated D cross section cursor 108b also are displayed on the evacuated coronal image 121b.

In D2 evacuation area 157, an evacuated sagittal image 122b is the same size as the evacuated sagittal image 122a corresponding to the evacuated sagittal image 122a displayed in A2 evacuation area 144 of FIG. 6. Further, an evacuated D cross section cursor 107b and an evacuated D cross section cursor 109b are displayed.

No display appears in D3 evacuating area 158. In D4 evacuation area 159, an evacuated oblique image 132b, which corresponds to the oblique image 132 displayed in D image displaying area 106 of FIG. 6, is one-half (½) the size of the oblique image 132. An evacuated double oblique cross section cursor 141b is also displayed.

With further reference to FIGS. 3, 6, and 7, a sorting operation of images provided in each of image displaying areas of the second evacuated image display MPR image 150 will be explained. When the panorama image 153 is constructed, the total number of displayed images and evacuated images becomes six (6), including the panorama image 153. Accordingly, an evacuating area is constructed in order to evacuate some of the displayed images and/or evacuated images.

Priority ordering is performed for determining priority order against the six (6) images. In FIG. 7, panorama image 153 of priority order 1 (latest image) is displayed in A image displaying area 103, coronal image 123 of priority order 2 (upper image construction condition setting image) is displayed in C image display area 105 double oblique image 142 of priority order 3 (constructed image prior to latest image) is displayed in B image displaying area 104, and the evacuated images are displayed together in the evacuating area of D image displaying area 106 because they are of a priority order 4 or less.

Priority ordering is performed against the six images (including the evacuated coronal image 121a, evacuated sagittal image 122a, axial image 123, oblique image 132 and double oblique image 142 shown in FIG. 6 and the newly constructed panorama image 153) based on the display conditions set in display condition setting window 170 of FIG. 3.

Since the latest image is ordered as the image of priority 1 and, in this example, panorama image 153 satisfies only this requirement, panorama image 153 is ordered as priority order 1. Next, axial image 123 that is necessary for setting the image construction condition of the panorama image 153 orders as priority order 2. Since evacuated coronal image 121a and evacuated sagittal image 122a are necessary for setting the image construction condition of the axial image 123, those evacuated images 121a and 122a have the same priority order. Thus, for determining priority order 3, further priority ordering is performed among the two evacuated images 121a and 122a, oblique image 132 and double oblique image 142.

The image constructed prior to the latest image is ordered as priority 3. Since double oblique image 142 satisfies this condition, that image 142 is ordered as priority order 3. Consequently, panorama image 153 of priority order 1, axial image 123 of priority order 2 and double oblique image 142 of priority order 3 are displayed in any one of the three areas of A image displaying area 103 to C image displaying area 105 in FIG. 7. In evacuation area 106b corresponding to D image displaying area 106, the three images of priority order 4 or less, i.e., evacuated coronal image 121a, evacuated sagittal image 122a and oblique image 132, are displayed.

In the second evacuated image display MPR image 150 of this embodiment, double oblique image 142 and axial image 123 are displayed in B image displaying area 104 and C image displaying area 105, the same configuration as in the first evacuated image MPR display image 140, and panorama image 153 is displayed in A image displaying area 103. The respective images are not restricted to display in a particular image displaying area.

In the second evacuated image display MPR image 150, D image displaying area 106 is used as an evacuation area 106b. It is possible to use another image displaying area as the evacuation area, for example, A image displaying area 103 shown in FIG. 6. Further, it is possible to alter the images or evacuated images by moving the cross section cursors in the D1 evacuating area 156, D2 evacuating area 157, D4 evacuating area 159 (which are made by dividing evacuation area 106b into four areas).

Figure 8:
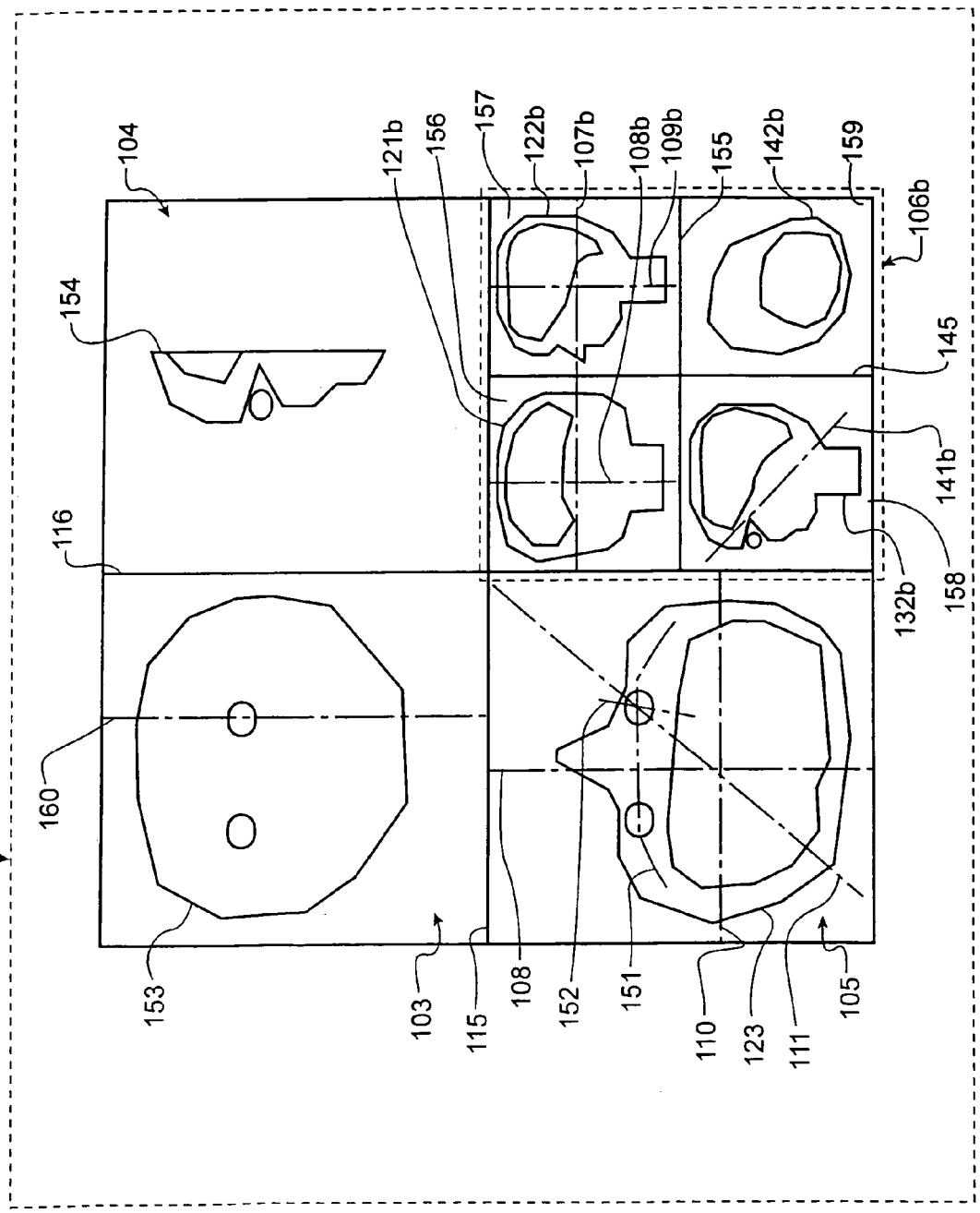
FIG. 8 depicts an MPR image that displays a third evacuated image consistent with an embodiment according to the present invention.

FIG. 8 explains the third evacuated image display MPR image 180 in that a crosscut image is constructed next to the panorama image 153 of the second evacuated image display MPR image 150 of FIG. 7.

In the third evacuated image display MPR image 180, a crosscut image and a crosscut cross section cursor are additionally displayed, e.g., in a predetermined area or in a predetermined image, by operating MPR control panel 102 in FIG. 2 when the second evacuated image display MPR image 150 is displayed.

Thus, A crosscut cross section cursor 160 is additionally displayed on the panorama image 153 of A image displaying area 103 in the third evacuated image display MPR image 160. The double oblique image 142 that was constructed in B image displaying area 104 is evacuated into the evacuation area 106b and crosscut image 154 is displayed in B image displaying area 104. In the axial image 123 displayed in C image displaying area 105, C crosscut cross section cursor 152 is additionally displayed, and four evacuated images including a newly evacuated double oblique image 123 are displayed in the evacuation area 106b.

On the panorama image 153 in A image displaying area 103, A crosscut cross section cursor 160 is additionally displayed.

This A crosscut cross section cursor 160 is displayed together with the crosscut cross section cursor 152 on the panorama image 153 by pushing the crosscut image display switch in MPR control panel 102. This A crosscut cross section cursor 160 is movable in A image displaying area 103 in a direction parallel to the lateral dividing line 115. Such movement of the A crosscut cross section cursor 160 manipulates the setting of the crosscut cross section cursor 152 and vice-versa.

The crosscut image 154 in B image displaying area 104 shows a respective cross section at the positions of A crosscut cross section cursor 160 and C crosscut cross section cursor 152, which are respectively displayed by a straight line on panorama image 153 in A image displaying area 103 and on axial image 123 in C image displaying area 105.

C crosscut cross section cursor 152, which may orthogonally cross the panorama cross section cursor 151, can be displayed by setting the cursor 152 at a desired position on the panorama cross section cursor 151 and optionally adjusting a length of the straight line.

Evacuation area 106b includes the same images as the evacuating area of the second evacuated image display MPR image 150. In D1 evacuating area 156 and D2 evacuating area 157, the respective evacuated images and cross section cursors are the same for FIG. 7 and FIG. 8.

The D3 evacuation area 158 in FIG. 8 is the same as the D4 evacuation area 159 in FIG. 7, such that the evacuated oblique image 132b and evacuated double oblique cross section cursor 141b are displayed. In the D4 evacuation area 159 of FIG. 8, evacuated double oblique image 142b, which is one-half (½) the size of double oblique image 142, corresponds to the double oblique image 142 in B image displaying area 104 of FIG. 7.

With reference FIGS. 7 and 8, a sorting operation of the images in the third evacuated image display MPR image 180 is explained. Due to a construction of the crosscut image 154, the total number of the images (including the evacuated images) becomes seven (7). Accordingly, priority ordering is performed against these seven images. The images of priority orders 1 to 3 are displayed in three image displaying areas chosen from among A image displaying area 103 to D image displaying area 106. The remaining three images of priority order 4 or less are displayed in the evacuation area by reducing their size to one-half size.

In this manner, priority ordering is performed against the seven images including evacuated coronal image 121b, evacuated sagittal image 122b, evacuated oblique image 132b, double oblique image 142, axial image 123, panorama image 153 and newly constructed crosscut image 154, based on the display conditions set in the display condition setting window 170 of FIG. 3.

In the priority ordering, the crosscut image 154 is the only image satisfying the condition/s of priority 1 since it is the latest image. Axial image 123, which was used to set the image construction condition of crosscut image 154 and panorama image 153, satisfies priority 2. Since A crosscut cross section cursor 160 being additionally set and displayed on axial image 123 is dependent on the C crosscut cross section cursor 152, in this case, axial image 123 fixed as priority order 2 and panorama image 153 falls as priority order 3.

Accordingly, crosscut image 154, axial image 123 and panorama image 153, which respectively rank at priority orders 1 to 3, are displayed in the three image displaying areas chosen from among A image displaying area 103 to D image displaying area 106. And evacuated coronal image 121b, evacuated sagittal image 122b, evacuated oblique image 132b and double oblique image 142, which rank at priority order 4 or less, are displayed in the evacuation area of the remaining image displaying area.

In the third evacuated image display MPR image 180 of this embodiment, the panorama image 153 and axial image 123 are respectively displayed in A image displaying area 103 and C image displaying area 105. And the crosscut image 154 is displayed in B image displaying area 104. The double oblique image 142 is evacuated. The selection of these image displaying areas for the respective images may be arbitrary or based on instructions, such as operator commands.

Further, the evacuated double oblique image 142 of FIG. 7 is displayed as the reduced evacuated double oblique image 142b of FIG. 8.

As to coronal image 121b, evacuated sagittal image 122b and evacuated oblique image 132b, the selection of their respective evacuated areas may be arbitrary or based on instructions, such as operator commands.

For each of the evacuated images of D1 evacuating area 156, D2 evacuation area 157, D3 evacuation area 158 in the evacuation area 106b, a cross section cursor is displayed. It is possible to alter images of both the image displaying areas and evacuating areas by moving the cross section cursors of the evacuated images, in a manner similar to moving cursors in the image displaying areas.

FIGS. 9 to 14 illustrate various operational functions on the MPR image as a starting point of evacuated image display MPR image 140 of FIG. 6.

Figure 9:
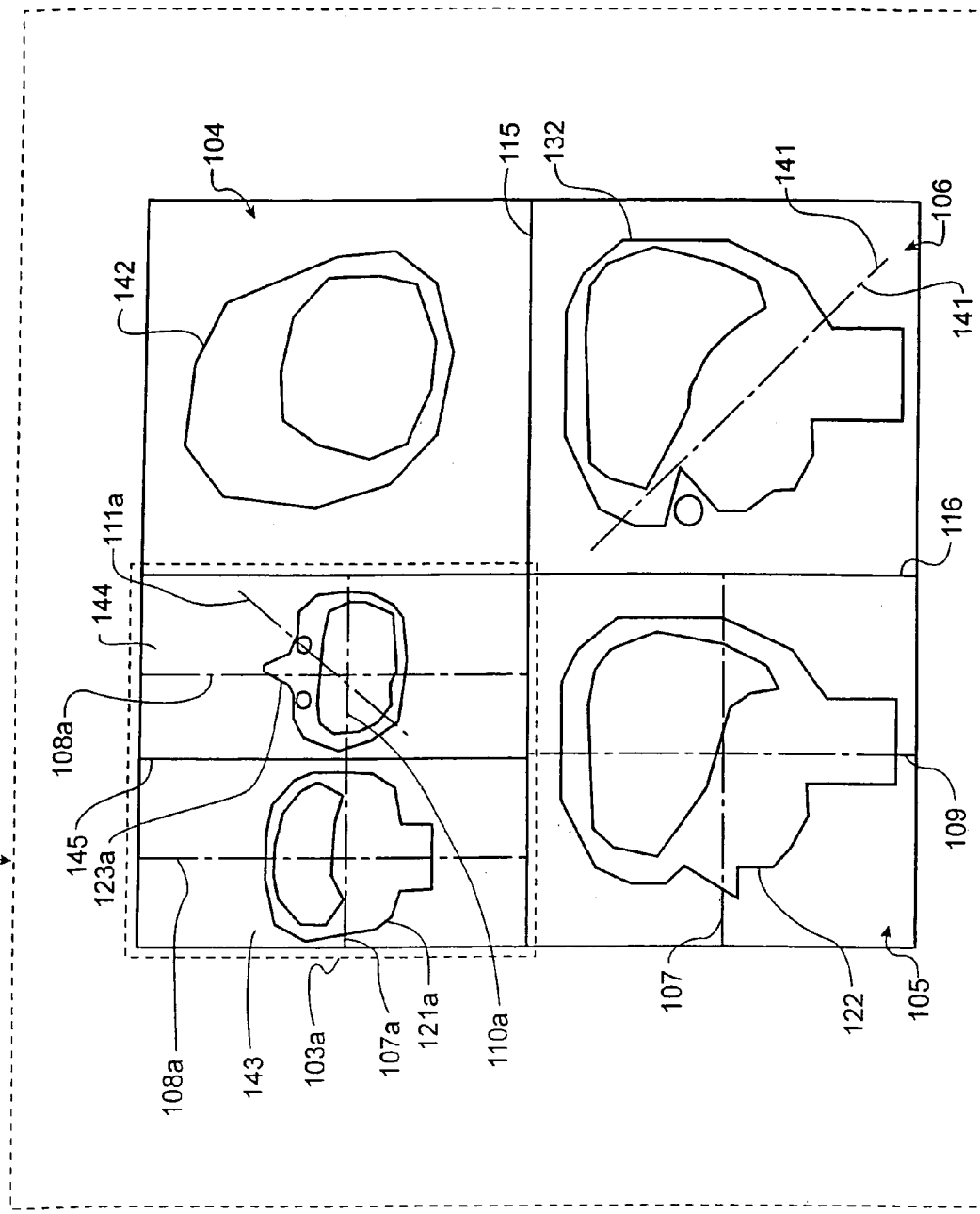
FIG. 9 shows an MPR image that replaces an evacuated image consistent with an embodiment according to the present invention.

FIG. 9 shows an evacuated image replacing MPR image 190 in which the evacuated sagittal image 122a in the first evacuated image display MPR image 140 shown in FIG. 6 is changed to the axial image 123a.

When the evacuated sagittal image 122a is displayed in the A2 evacuating area 144 shown in FIG. 6, unwanted images are selected for display in the image displaying area. The unwanted images may be exchanged with the evacuated coronal image 121a and evacuated sagittal image 122a of FIG. 6. Thus, the evacuated sagittal image 122a of FIG. 6 is displayed as the C image displaying area 105 of FIG. 9.

As an exemplary case, suppose an operator has finished viewing the image axial image 123 in FIG. 6. It is possible to change the evacuated sagittal image 122a to the axial image 123 by performing a replacing operation via a mouse in the operation unit 4. Thus, after fixing a pointer on the evacuated sagittal image 122a displayed in A2 evacuation area 144, the evacuated sagittal image 122a is dragged and released in C image displaying area 105.

In C image displaying area 105 of the evacuated image replaced MPR image 190, an enlarged sagittal image 122 of the evacuated sagittal image 122a in FIG. 6 and corresponding cursors 107 and 109 are displayed. In the A2 evacuation area 144 of evacuated image replaced MPR image 190, evacuated axial image 123a, which is made by reducing the size of axial image 123 in FIG. 6, and corresponding cursors 103a and 108a are displayed.

Accordingly, by placing the unwanted images in an evacuated image area, as opposed to merely storing the unwanted image to memory, it is possible to easily search for the unwanted evacuated image and return the same to the original size for better viewing. Conversely, the unwanted image can be easily moved to the evacuation area by reducing its size.

Figure 10:
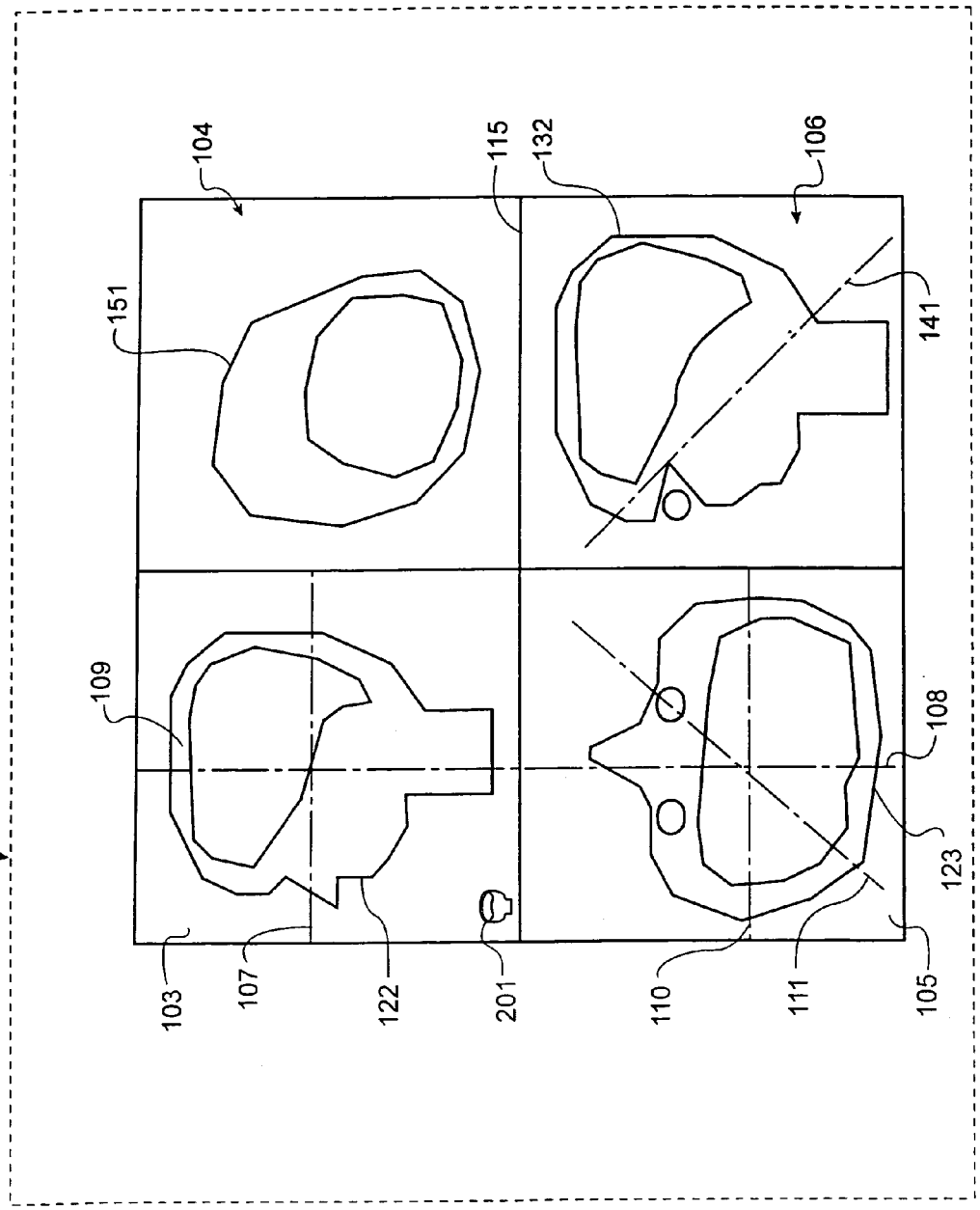
FIG. 10 depicts an MPR image that displays an enlarged evacuated image consistent with an embodiment according to the present invention.

FIG. 10 illustrates an evacuated image enlarged display MPR image 200. This enlarged image 200 is returned to the original size of the evacuated sagittal image 122a, as displayed in the first evacuated image display MPR image 140 shown in FIG. 6.

An operator can view the evacuated sagittal image 122a at full size in an image displaying area, even when an unnecessary image may not exist among the displayed images in image displaying area at that time. The evacuated coronal image 121a is displayed at a substantially reduced size 201 to return the evacuated sagittal image 122a to its original size.

Enlarging of the evacuated image is performed as follows. For example, sagittal image 122 is displayed in A image displaying area 103 of the evacuated image enlarged display MPR image 200 by an enlarging operation via mouse operation. Since the evacuated sagittal image 122a is displayed in A2 evacuation area 144, a pointer is moved on the evacuated sagittal image 122a of the enlarged display MPR image 200. Then, the mouse operation is performed.

On the sagittal image 122 of evacuated image enlarged display MPR image 200, an evacuated A cross section cursor 107 and an evacuated A cross section cursor 109 are displayed. Further, the store mark 201,which shows the substantially reduced evacuated coronal image 121a, is displayed at a lower portion of A image display area 103.

By viewing this store mark 201, the operator can understand that the evacuated coronal image 121a is stored under the sagittal image 122.

Accordingly, the operator can easily search through evacuated images. Also, it becomes possible to display an evacuated image at the original size in the evacuating area.

Figure 11:
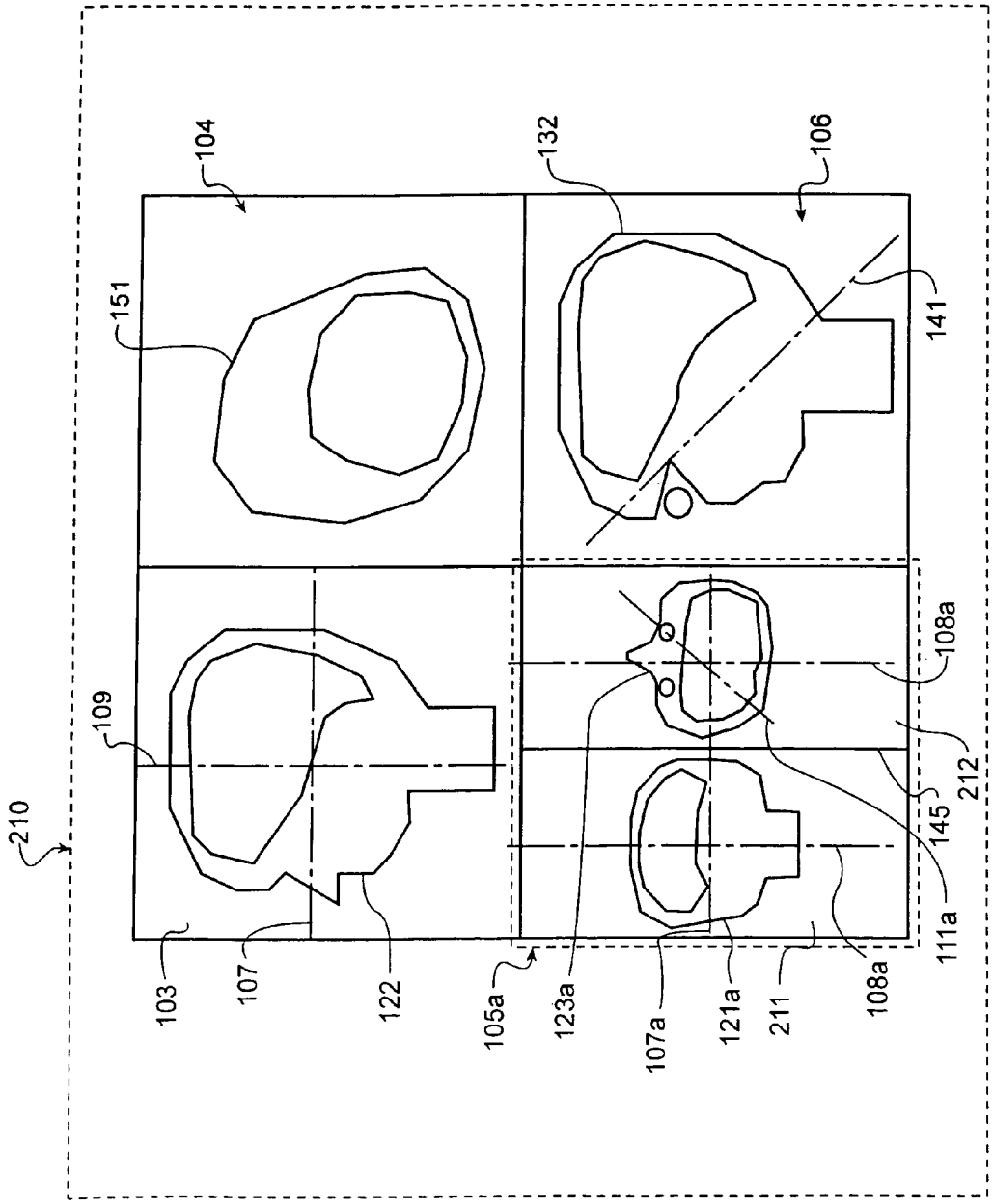
FIG. 11 depicts an image evacuated MPR image consistent with an embodiment according to the present invention.

FIG. 11 shows an image evacuated MPR image 210 in which the axial image 123 displayed in the C display image area 105 of the evacuated image enlarged display MPR image 200, shown in FIG. 10, is evacuated into an evacuating area 212.

In order to evacuate the axial image 123 of the evacuated image enlarged display MPR image 200, a pointer is moved to the C image displaying area 105 in which the axial image 123 is displayed and an evacuating operation, e.g., through mouse operation of operation unit 4, is performed. For example, by double clicking the mouse on the axial image 123 of the evacuated image enlarged display MPR image 200, the image evacuated MPR image 210 may be displayed. By doing this, C image displaying area 105 becomes C evacuating area 105a.

In the image evacuated MPR image 210, C evacuation area 105a is displayed. The C evacuation area 105a is divided into a C1 evacuation area 211 and a C2 evacuation area 212 by a longitudinal evacuation area dividing line 145.

In C2 evacuation area 212, an evacuated axial image 123a and corresponding cursors 107a and 109a are displayed. The evacuated axial image 123a is a reduced axial image 123 that was displayed in the evacuated image enlarged display MPR image 200.

In C1 evacuation area 211, an evacuated coronal image 121a and corresponding cursors 107 and 108a are displayed. The evacuated coronal image 121a was stored under A image displaying area 103 of the evacuated image enlarged display MPR image 200.

Figure 12:
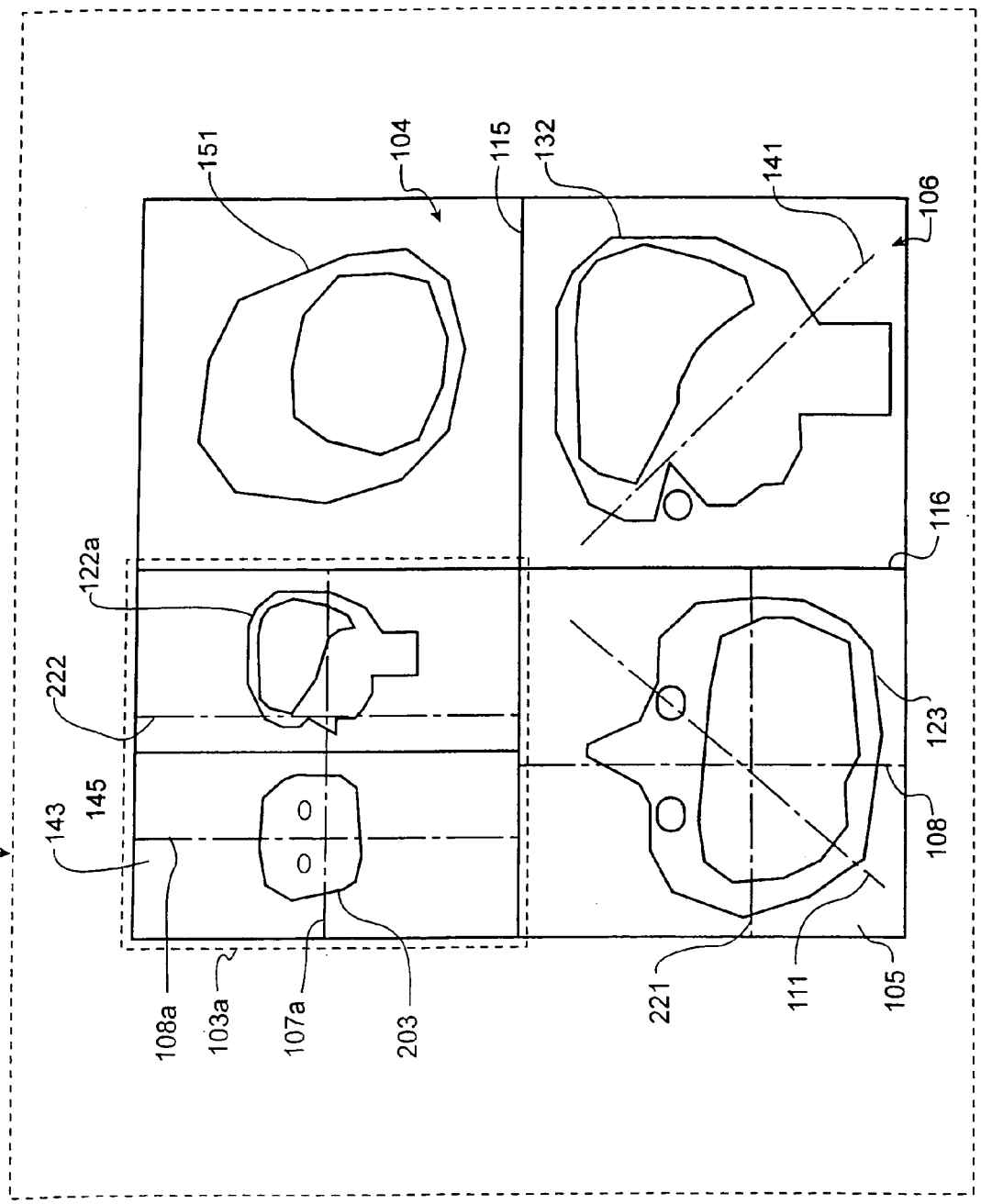
FIG. 12 illustrates an MPR image after moving cross sectional cursor consistent with an embodiment according to the present invention.

FIG. 12 shows C cross section cursor moved MPR image 220 in which C cross section cursor 110 displayed on the axial image 123 of C image displaying area 105 of the first evacuated image display MPR image 140, shown in FIG. 6, is displayed as A cross section cursor 221.

To change the evacuated coronal image 121a displayed in A1 evacuating area 143 of FIG. 6, C cross section cursor 110 of C image displaying area 105 is moved upwards, as is shown by C cross section cursor 221. By moving the cursor, an operator can change the evacuated coronal image 121a shown in FIG. 6 to the evacuated coronal image 203 of FIG. 12.

Further, by moving the evacuated B cross section cursor 109a shown in FIG. 6 to the left and setting it at the position of the evacuated B cross section cursor 222 as shown in FIG. 12, an operator can change the evacuated coronal image 121a to the evacuated coronal image 203. C cross section cursor 110 is also moved to upwards, in parallel to the movement of the evacuated B cross section cursor 109a, to the position of the moved C cross section cursor 221 of FIG. 12.

Figure 13:
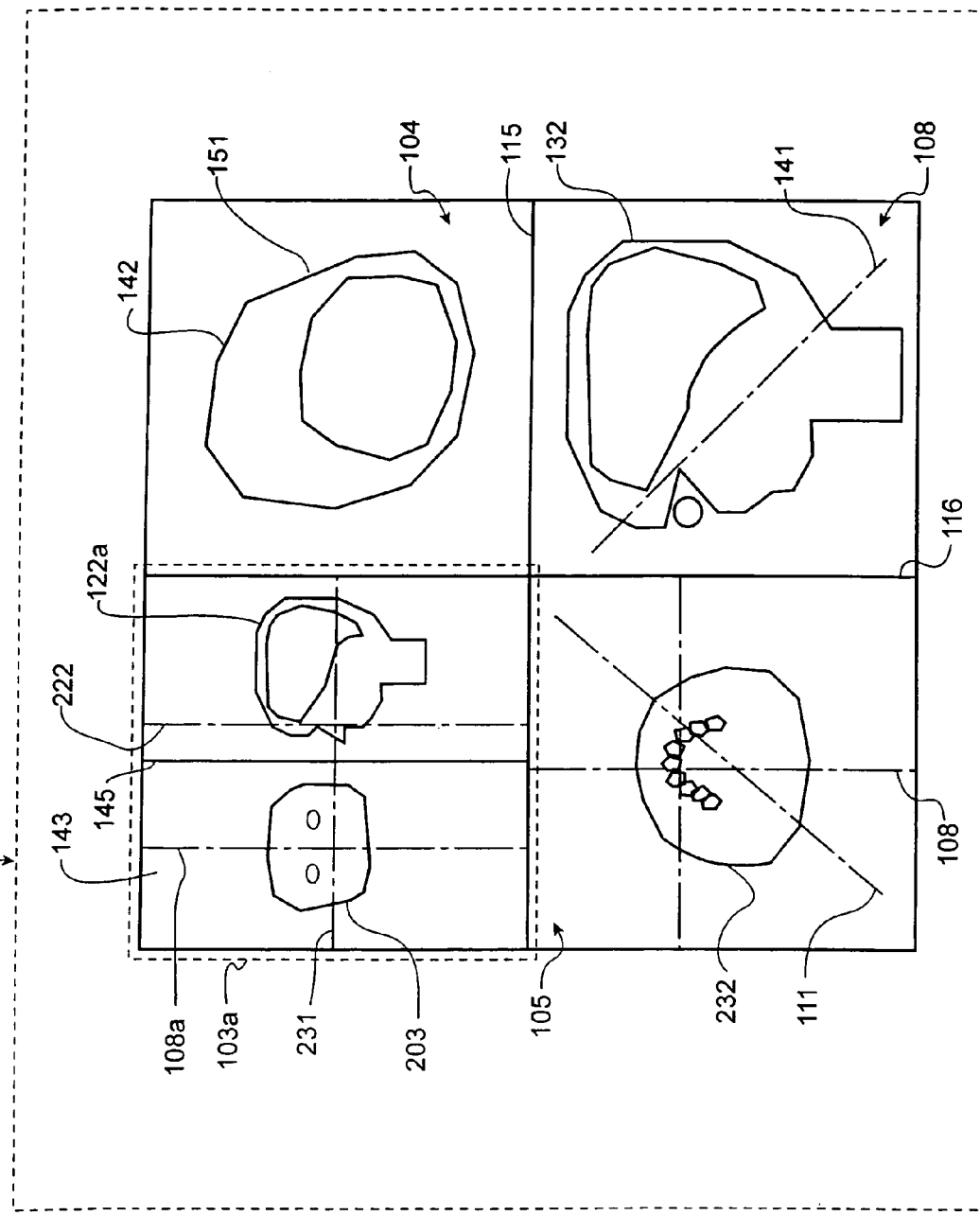
FIG. 13 illustrates an MPR image after moving cross sectional cursor consistent with an embodiment according to the present invention.

FIG. 13 shows an A cross section cursor moved MPR image 230 in which the evacuated AB cross section cursor 107a of FIG. 12 is moved to the C cross section cursor moved MPR image 220.

When it happens to need to change the axial image 123 displayed in the C image displaying area 105 of the C cross section cursor moved MPR image 220, an operator can change to the cross section cursor moved axial image 232 shown in FIG. 13 by moving the evacuated AB cross section cursor 107a displayed in A evacuation area 103a to the position of the moved evacuated AB cross section cursor 231.

Figure 14:
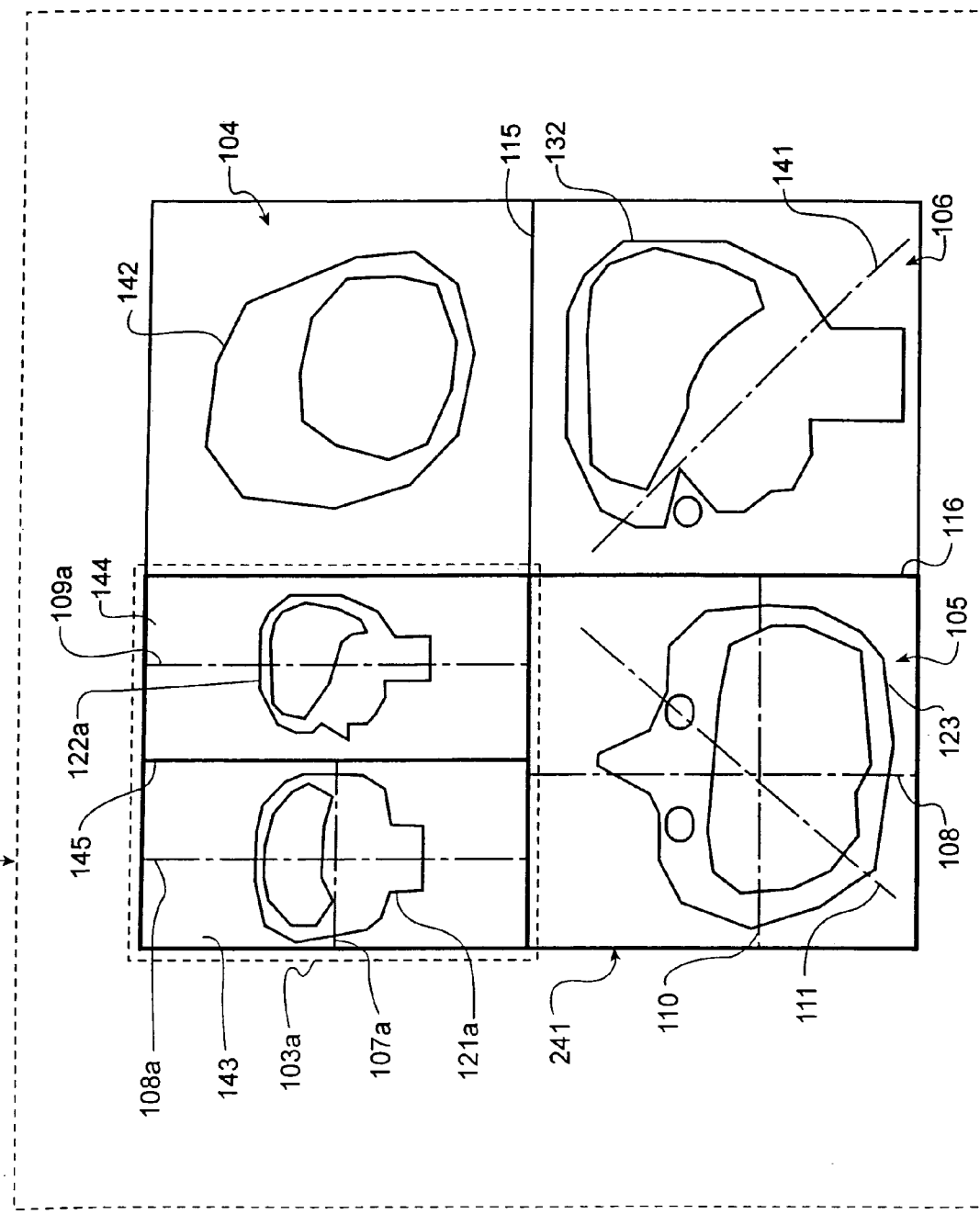
FIG. 14 illustrates an MPR image of a highlighted display consistent with an embodiment according to the present invention.

FIG. 14 shows a highlighted display MPR image 240 in which the first evacuated image display MPR image 140 in FIG. 6 is displayed by highlighting.

By moving a pointer onto C image displaying area 105 (in which the axial image 123 of FIG. 6 is displayed) via mouse operation of the operation unit 4, the A1 evacuation area 143 and A2 evacuation area 144, which are displaying and setting image construction conditions of the axial image 123, and the C image displaying area 105 are highlighted by, for example, a bold line 241 surrounding the respective rectangular frames.

As explained above, evacuated images can be searched and used as reference images for diagnosis by sorting images of a higher priority and providing at least one evacuating area. Images of higher priority orders may be displayed in the image displaying areas, while images of lower priority orders may be displayed in an evacuation area by reducing their image size. Further, operators may arbitrarily exchange images between image displaying areas and evacuation areas after priority ordering is performed.

Further, it is possible to change cross section images in the image displaying areas by altering their image construction conditions, e.g., moving cursors, shown on evacuated images, and vice-versa.

The present invention is not limited to the above explained embodiments. For instance, it may applicable to display in more than five image displaying areas. Further, it may provide a plurality of evacuating area if many kind of images are constructed.

Other embodiments consistent with the present invention will be apparent to those skilled in the art from consideration of the specification and practice of the present invention disclosed herein. The specification and examples are for exemplary purposes only.

What is claimed is:

1. An image processing apparatus, comprising:
    an image construction unit configured to output a plurality of different MPR images based on external image data acquired through image diagnosis equipment;
    a condition setting unit configured to set a priority order of display conditions for the MPR images;
    a displaying unit configured to display the MPR images at a plurality of image displaying areas including full image displaying areas and at least one evacuating image displaying area;
    a sorting unit configured to sort the plurality of MPR images into images for construction and images for evacuation based on the priority order of the display conditions, when a number of the MPR images exceeds a number of the image displaying areas; and
    a control unit configured to control display of the MPR images in the full image displaying areas and the evacuating image displaying area, and to reduce the images for evacuation into a predetermined size.

2. The image processing apparatus according to claim 1, wherein:
    the evacuating area is configured to be divided into a plurality of divisional evacuation areas,
    the MPR image constructing unit is configured to construct a second MPR image in a second full image displaying area based on an image construction condition of a first MPR image displayed in a first full image displaying area, and
    the MPR image constructing unit is configured to construct a first evacuated image in a first divisional evacuation area, the first evacuated image being selected from among the MPR images.

3. The image processing apparatus according to claim 1, wherein:
    the MPR image constructing unit is configured to construct a new MPR image based on an image construction condition set against a previously constructed MPR image.

4. The image processing apparatus according to claim 2, wherein:
    the MPR image constructing unit is configured to construct a second evacuated image in a second divisional evacuation area of the evacuating image displaying area.

5. The image processing apparatus according to claim 2, wherein:
    the MPR image constructing unit is configured to construct a second evacuated image in a second divisional evacuation area, and
    the MPR image constructing unit is configured to construct the second evacuated image based on an image construction condition set against the first evacuated image.

6. The image processing apparatus according to claim 5, wherein:
    the MPR image display unit includes a highlighted display of at least one of the full image displaying areas and the evacuating image displaying area.

7. The image processing apparatus according to claim 1, wherein:
    the MPR image constructing unit is configured to exchange an MPR image displayed in the evacuating image displaying area and an MPR image displayed in one of the full image displaying areas.

8. An image processing method, comprising:
    outputting a plurality of different MPR images based on external image data acquired through image diagnosis equipment;
    setting a priority order of display conditions for the MPR images;
    displaying the MPR images at a plurality of image displaying areas including full image displaying areas and at least one evacuating image displaying area;
    sorting the plurality of MPR images into images for construction and images for evacuation based on the priority order of the display conditions, when a number of the MPR images exceeds a number of the image displaying areas; and
    controlling display of the MPR images in the full image displaying areas and the evacuating image displaying area, and reducing the images for evacuation into a predetermined size.

9. The image processing method according to claim 8, further comprising:
    dividing the evacuating image displaying area into a plurality of divisional evacation areas,
    constructing a second MPR image in a second full image displaying area based on an image construction condition of a first MPR image displayed in a first full image displaying area; and constructing a first evacuated image in a first divisional evacuation area, the first evacuated image being selected from among the MPR images.

10. The image processing method according to claim 8, further comprising:

constructing a new MPR image based on an image construction condition set against a previously constructed MPR image.

11. The image processing method according to claim 9, further comprising:

constructing a second evacuated image in a second divisional evacuation area of the evacuating image displaying area.

12. The image processing method according to claim 9, further comprising:

constructing a second evacuated image in a second divisional evacuation area; and constructing the second evacuated image based on an image construction condition set against the first evacuated image.

13. The image processing method according to claim 12, further comprising:

highlighting display of at least one of the full image displaying areas and the evacuating image displaying area.

14. The image processing method according to claim 8, further comprising:

exchanging an MPR image displayed in the evacuating image displaying area and an MPR image displayed in one of the full image displaying areas.

\* \* \* \* \*